United States Patent [19]

Hashizume et al.

[11] 3,922,359

[45] Nov. 25, 1975

[54] METHODS OF PRODUCING PROTEIN MATERIALS

[75] Inventors: Kazumoto Hashizume, Chiba; Tokuji Watanabe, Tokyo, both of Japan

[73] Assignee: Director of National Food Research Inst., Japan

[22] Filed: Mar. 28, 1973

[21] Appl. No.: 345,753

[30] Foreign Application Priority Data

Apr. 1, 1972 Japan.............................. 47-32158

[52] U.S. Cl. ................. 426/574; 426/656; 426/524
[51] Int. Cl.²............................................ A23J 3/00
[58] Field of Search ............ 426/364, 350, 212, 167

[56] References Cited
UNITED STATES PATENTS 3,490,914   1/1970   Okumura et al.................... 426/364

3,801,713   4/1974   Tolstoguzov et al................ 426/239

*Primary Examiner*—James R. Hoffman
*Attorney, Agent, or Firm*—McGlew and Tuttle

[57] ABSTRACT

This invention relates to methods of producing protein material from soybean or other vegetable materials containing protein, which protein material is useful as food. This protein material is produced by freezing a protein-containing solution, keeping it frozen for a specific time, thawing it, and then separating the protein material thus formed by filtration or centrifugation. A special feature of the process of this invention is to add a divalent salt into a protein-containing solution prior to freezing.

6 Claims, 1 Drawing Figure

METHODS OF PRODUCING PROTEIN MATERIALS

BACKGROUND AND SUMMARY OF THE INVENTION

This invention relates to a method of producing protein material. Recently, methods have been developed to produce food substances in a textured state from soybeans. These substances can be utilized to produce meat-like food, or they can be used as a partial substitute for meat products. As representative methods for producing the said food substances, there are mentioned methods for extruding defatted soybean meal while heating under high pressure to texturize the material, methods for spinning the alkaline treated protein separated from defatted soybean meal to make proteinous fiber, and methods for producing a slurry of moistened, ground soybean protein, freezing the said slurry and thawing it to make a spongy texture, and the like methods.

Soybean protein forms a spongy texture by dissolving it into water, freezing the solution and thawing it. The following formation mechanism has been known; a protein is condensed in ice by freezing of water and proteins combine with each other with S—S bond combination to produce gelling. When the gel is thawed a lot of holes are made at the portion of gel corresponding to ice in the gel and a semitransparent, elastic and spongy texture is formed followed by separation with filtration or centrifugation. The spongy protein texture obtained is very useful as a food material.

However, insolubilization of protein with freezing is not carried out perfectly. Thus, there are many proteins which are not insolubilized and are re-dissolved at the thawing step. Also, the reaction of combining with protein molecules requires a long time. Accordingly, a long time is required keeping the protein in the freezing state.

On the other hand, a spongy texture is similarly obtained with a high yield by crushing protein precipitate and by freezing said precipitate. However, the texture properties thus obtained are inferior in transparency, elasticity, moisture retention, gellation and the like, because the method consists in combining fine protein precipitates with each other by freezing.

An object of the present invention is to obtain protein materials advantageously. It is a further object of the invention to provide a method which comprises adding a divalent salt to a protein solution, freezing said solution and thawing it.

According to the method of this invention, the product of the method is obtained in high yield in a short time and also, its quality is excellent.

BRIEF DESCRIPTION OF THE DRAWING

The only FIGURE of the drawing shows the relationship of the concentration of divalent salt and the weight(%) of the insoluble protein. After addition of calcium chloride to the protein solution, the solution is frozen at −20°C and kept at −5°C for 2 days, and then thawed.

DETAILED DESCRIPTION OF THE INVENTION

Figure 1:
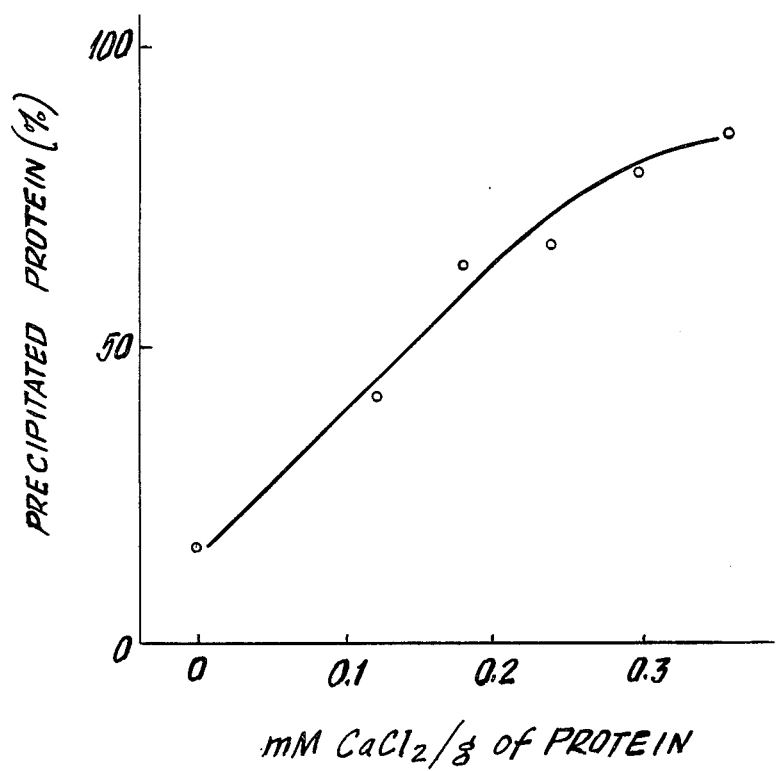

The present invention utilizes the property of soybean protein wherein it is specifically precipitated by adding such divalent salts as Ca salts, Mg salts, and the like and is gelled. Moreover, the present invention utilizes the property that the protein is insolubilized by freezing. Thus, the invention comprises combining the above mentioned properties of the protein. Namely, the invention comprises adding a divalent salt into a solution of separated protein, freezing the solution and thawing it followed by separation with filtration or centrifugation. It is a specific feature of the present invention that the divalent salt is added to a chilled protein solution prior to the freezing step.

The weight of divalent salt to be added is preferably of such a degree that the solution becomes white-turbid with protein and a part of the protein is still in the dissolved state. The texture of protein separated is non-elastic if divalent salt is added up to the level of precipitating all proteins. Generally, it is preferred to add the divalent salt in the range of 0.2 to 0.36 mM per 1 g of protein.

After addition of the divalent salt, the protein solution is frozen. The protein and divalent salt solution, is concentrated by this freezing step. Further, an intermolecule combination such as S—S bonding occurs in the protein molecules and simultaneously a combination reaction occurs due to the divalent salt. Accordingly, the gelling of protein is sufficiently progressed in a short time while being kept in the freezing state. As a result, the amount of protein which is not entrapped to the gel is very little. Moreover, the protein texture thus obtained is the same as the one which is produced without addition of divalent salt.

As mentioned above, in the method of the present invention, a divalent salt is added to the protein solution prior to freezing of the said solution. Accordingly, the combination reaction among protein molecules during freezing is carried out more promptly and perfectly, and all of the protein in the solution is turned into a porous gel.

The present invention is further illustrated in the following examples, which examples are not intended to limit the invention.

EXAMPLE 1

A hundred grams of defatted soybean meal was extracted with 1500 ml of water and the mixture was the centrifuged to get the extract. The pH of the extract solution which was obtained was adjusted to 4.5 by addition of 1N-HCl. The protein was perfectly dissolved by the pH adjustment.

The protein solution was heated at 100°C for 1 minute and thereafter, was chilled. The concentration of the protein was about 4.2%. The protein solution was divided into 6 parts and 1M-calcium chloride solution was added to each of them in the range of 0.015 to 0.005mol (corresponding to 0.36–0.12 M Mol/g of protein). After addition, the solution was frozen at −20°C and was kept at −5°C for a specific period. Thereafter, it was thawed and the quantity of insolubilized protein was measured. The result was as shown in Table 1 and the only FIGURE of the drawing. From the table, it was understood that a sufficient period of keeping the protein solution in the freezing state was less than 2 days.

The only FIGURE of the drawing shows the relationship between the concentration of divalent salt and the weight percent of the insoluble protein. The experimental conditions are as follows; freezing the protein solution at −20°C; keeping it at −5°C for 2 days; dissolving it in a 0.01M of CaCl$_2$ solution and washing it with water.

It was understood from the result that the effective weight of calcium chloride was more than 0.2 M mol/g of protein. However, addition of more than 0.3 M mol/g of protein causes precipitation of protein and thus, good results are not obtained.

Table 1

| Concentration of $CaCl_2$ | Quantity of protein insolubilized | |
| --- | --- | --- |
| | −5°C, 2days | −5°C, 5days |
| 0.36 mmol/g of protein | 85% | 84% |
| 0.30 | 79 | 80 |
| 0.24 | 66 | 68 |
| 0.18 | 63 | 61 |
| 0.12 | 41 | 47 |
| 0 | 16 | 17 |

EXAMPLE 2

After extraction of 1 kg of defatted soybean meal with 15 l of water, residue was removed and an extract solution was obtained. By addition of hydrochloric acid, the pH of the solution was adjusted to 4.5 and this caused the precipitation of protein. The precipitate was washed with a large quantity of water and thus, materials other than protein were removed. Then, the protein was suspended in 5 l of water and the pH of the suspension was adjusted to 7.0 by addition of caustic soda in order to dissolve the protein. The protein solution was heated at 100°C for 1 minute. After cooling, 0.01M (corresponding to 0.25 M mol/g of protein) of calcium chloride solution was added to the solution; namely, 7.35 g of $CaCl_2.2H_2O$ was added to 5 l of the solution. As a result, the protein solution became opaque and assumed an emulsified state. The emulsified solution was frozen at −20°C and immediately kept at −5°C.

After 2 days, the frozen substance was thawed in 0.01M calcium chloride solution and followed by washing and dehydration. About 550 g of spongy protein material having about 60% of water content was obtained.

EXAMPLE 3

A protein solution was prepared in the same procedure as described in Example 2 and was heated. After cooling, calcium chloride solution was added to the solution in the final concentration of 0.013M (corresponding to 0.33 mM/g of protein), that is to say, 9.6 g of $CaCl_2.2H_2O$ was added to 5 l of the solution. As a result, the solution became white-turbid due to protein. However, a precipitate did not occur and the problem was in a suspended state. The suspension was frozen at −20°C and immediately kept at −5°C.

After 1 day, the frozen substance was thawed in water which was followed by washing and dehydration.

About 560 g of spongy protein material having about 58% water content was obtained.

EXAMPLE 4

After extraction of 1 kg of defatted soybean meal with 6 l of water, the residue was removed.

The extract solution was heated at 100°C for 1 minute and then chilled. After cooling, calcium chloride was added to the solution in the final concentration of 0.01M; namely, 7.35 g of $CaCl_2.2H_2O$ was added to 5 l of the solution. Then, the solution was immediately frozen and kept at −2°C. After 1 day, the frozen substance was thawed in water which was followed by washing and dehydration. About 500 g of spongy protein material having about 60% water content was obtained.

What is claimed is:

1. A method of producing solid protein material with a spongy texture, which comprises adding an edible divalent salt to a solution of soybean protein in such an amount that the solution becomes turbid white with protein, a part of said protein being still dissolved, freezing the said solution, keeping the solution frozen for from about one to two days, and then thawing and recovering the resultant solid protein material.

2. A method as claimed in claim 1, wherein the amount of edible divalent salt to be added is from 0.20 to 0.30 m mol per 1 g of protein.

3. A method as claimed in claim 2, wherein the freezing step is carried out at a temperature of about −20°C.

4. A method as claimed in claim 2, wherein the keeping step is carried out at a temperature of about −5°C.

5. A method as claimed in claim 1, wherein the freezing step is carried out at a temperature of about −20 C.

6. A method as claimed in claim 1, wherein the keeping step is carried out at a temperature of about −5°C.

* * * * *